United States Patent [19]

Chevalley et al.

[11] 4,084,011
[45] Apr. 11, 1978

[54] PREPARATION OF MILK CRUMB FOR MILK CHOCOLATE MANUFACTURE

[75] Inventors: Janine Chevalley, La Tour-de-Peilz; Walter Rostagno, Corseaux; Jean-Pierre Besson, Clarens, all of Switzerland

[73] Assignee: Societe d'Assistance Technique pour Produits Nestle S.A., Lausanne, Switzerland

[21] Appl. No.: 670,228

[22] Filed: Mar. 25, 1976

[30] Foreign Application Priority Data

Apr. 2, 1975 Sweden .................................. 4151/75

[51] Int. Cl.² .......................... A23C 23/00; A23G 1/00
[52] U.S. Cl. ..................................... 426/580; 426/584; 426/587; 426/631; 426/660
[58] Field of Search ............... 426/584, 660, 631, 454, 426/580, 587

[56] References Cited

U.S. PATENT DOCUMENTS

333,652   1/1886   Matthiessen .................... 426/454
3,098,746  7/1963  Noznick et al. ................. 426/660

OTHER PUBLICATIONS

Minifie; B. W., Chocolate, Cocoa and Confectionary, J & A Churchill, London, 1970 (pp. 91–104).
Compression of Dehydrated Foods Will Save Shipping Space, Food Industries, 2/1943 (pp. 74–75).
Hanrahan et al., Properties of Compressed Nonfat Dried Milk, J. Da. Sci., vol. 48, No. 11, 1965 (pp. 1533–1535).

*Primary Examiner*—David M. Naff
*Attorney, Agent, or Firm*—Watson, Leavenworth, Kelton & Taggart

[57] ABSTRACT

Milk crumb for use in milk chocolate manufacture is prepared by forming a mixture containing milk, sugar and optionally cocoa, drying the mixture under reduced pressure to form a milk crumb product and compressing the crumb product under a pressure of at least 100 Kg/cm² to crystallize amorphous sugar present in the crumb.

6 Claims, No Drawings

PREPARATION OF MILK CRUMB FOR MILK CHOCOLATE MANUFACTURE

BACKGROUND OF THE INVENTION

1. Field of the Invention

This invention relates to a method of making milk chocolate, more especially by the "crumb" process.

2. Description of the Prior Art

The crumb is a product unique to the chocolate industry which is obtained by drying a mixture of concentrated milk, sugar and cocoa liquor under reduced pressure. The product thus obtained is then stored for periods ranging from a few weeks to a few months, after which it is enriched in fats, such as cocoa butter, and converted into milk chocolate by well known technological operations. This "crumb" process is used for making milk chocolate of superior quality and with better keeping properties. The object of storage is to allow cystallisation of the sugar present in amorphous form in the freshly prepared crumb. In the absence of storage, the sugar would crystallise prematurely during processing of the crumb into milk chocolate. In practice, therefore, any conventional crumb process presupposes the availability of considerable storage facilities which add correspondingly to the production costs. Storage may be replaced by a treatment for 1 hour at 60° C/60% relative humidity, but this is only a makeshift solution which is equally expensive.

SUMMARY OF THE INVENTION

The present invention remedies the situation described above. The invention provides a method of making a milk chocolate in which a mixture based on milk and sugar is prepared and then dried under reduced pressure to form a product of the crumb type which is compressed under a pressure of at least 100 kg/cm² and then processed into milk chocolate.

DESCRIPTION OF THE PREFERRED EMBODIMENTS

In the majority of cases, the mixture based on sweetened concentrated milk and sugar also contains cocoa liquor, i.e. a material which has a melting point of approximately 35° C and which is obtained by the fine grinding of cocoa beans. This mixture may also contain other ingredients, for example lecithin.

The mixture may of course be formulated from reconstituted milk, for example from milk powder. Since its dry matter content normally amounts to between 80 and 85%, it is generally preferred to prepare it from concentrated milk or even sweetened concentrated milk, reconstituted or otherwise. Traditionally, the mixture consists of 45 to 52 parts of sweetened concentrated milk, 22 to 41 parts of sugar and 13 to 17 parts of cocoa liquor.

Drying under reduced pressure, preferably from 5 to 20 mm Hg, at a temperature of the order of 80° C gives a crumb. In the crumb thus freshly prepared, most of the sugar, generally from 50 to 80% and sometimes up to 100% by weight of the total sugar, is present in the amorphous state. This crumb is referred to hereinafter by the expression "fresh crumb" in order to distinguish it from the crumb which has undergone the compression treatment according to the invention. It is in the form of a more or less cellular cake which is generally ground to form a powder with a grain size of from 100 to 1000 μm, preferably from 600 to 900 μm. The composition varies according to the recipe of the milk chocolate which it is desired to make, but is normally within the following limits by weight:

residual moisture: 1 to 5%, preferably 2 to 3%
sugar: 35 to 60%
other non-fat solids: 20 to 35%
cocoa fats: 4 to 12%
lactic fats: 4 to 12%, emanating completely or in part from the starting milk.

More information on the crumb and its methods of production may be found in the article by F. Perry in Conf. Production 36 (10), 609-11 (1970), in chapter 5 of B. Minifie's book entitled "Chocolate, Cocoa and Confectionary Science and Technology", Pergamon Press, London (1970) or even in British Patent Specification No. 1,306,356.

In cases where the mixture based on sweetened concentrated milk and sugar does not contain any non-fat solids from the cocoa, drying of the mixture gives a product of the crumb type, in the present case a "white crumb" which, providing no non-fat solids from the cocoa are subsequently added, allows the production of particular milk chocolates known as white chocolates.

Hereinafter, the word crumb will be used in its broad sense for designating both a conventional crumb within the composition ranges indicated earlier on or within similar ranges, and a product of the crumb type such as, for example, a white crumb.

According to the invention, the crumb is compressed under a pressure of at least 100 kg/cm² and preferably under a pressure of from 600 to 900 kg/cm². The effect of this compression is to induce rapid crystallisation of the amorphous sugar which the fresh crumb contains, so that compression performs a function comparable with that of the storage stage in conventional crumb processes. It has also been found that the minimum pressure which has to be applied to achieve this result is governed by the moisture content of the fresh crumb. The lower limit of approximately 100 kg/cm² is an approximate limiting value for a moist fresh crumb, i.e. a fresh crumb with a moisture content of 5% or more. For example, a pressure of only 70 kg/cm², applied to a crumb with a moisture content of 5%, leaves from 10 to 20% of sugar in amorphous form in relation to the total sugar, i.e. too much for the rest of the production of the milk chocolate to be able to be carried out with total equanimity. The pressures of from 600 to 900 kg/cm² are preferred values which correspond to a fresh crumb with a residual moisture content of from 2 to 3%.

In addition, it has been found that, for correctly crystallising the amorphous sugar present in the fresh crumb, the temperature to which the crumb has to be subjected during compression is higher, the drier the fresh crumb for the same compression value. However, temperatures above approximately 100° C are avoided because, in that case, a burnt taste appears in the crumb. It is considered that a temperature of from 70° to 95° C, preferably from 80° C to 95° C, is a suitable temperature for a fresh crumb with a residual moisture content of 2.5% compressed under a pressure of 800 kg/cm². In practice, it is frequently unnecessary to use special heating means because, in general, mere application of the pressure enables temperatures such as those mentioned above to be reached in the crumb mass. Heating may be useful during the first few minutes of the operation. As a result, it may even be necessary to cool the crumb.

The rate at which the pressure is established does not have any pronounced effect upon the crystallisation of the amorphous sugar present in the fresh crumb. So far as the compression time is concerned, it is merely selected in such a way as to cause the temperature of the crumb to rise suitably. As a general rule, compression times of from 0.3 to 1 second are considered adequate. Finally, the grain size of the fresh crumb is not an important factor, the crumb being ground before treatment solely for reasons of convenience.

After compression, the crumb, which is again present in a compact form, is ground, fats, such as cocoa butter, are added to it, followed by processing into milk chocolate by known methods.

In a first embodiment of the method according to the invention, the fresh, ground crumb is spread out in the form of thin layers (1 to 2 cm thick) and then crushed between the plates of a press. It is preferably distributed in a cavity block and compressed inside that block by means of a die of which the projecting parts correspond to the cavities in the block.

In a second preferred embodiment, the fresh, ground crumb is brought between two contra-rotating grooved cylinders, of which the grooves fit one inside the other during the convergent rotary movement, leaving an empty space which may be varied in dependence upon the intensity of the pressure which it is desired to apply. The compressed crumb is then recovered by gravity at the lower end of the grooved cylinders. In one variant of this embodiment, the cavities defined by the grooves of the cylinders are formed in at least one of the cylinders with a hole or with a series of holes which open at the inner wall, the grooves fitting exactly in one another without leaving an empty space. During compression, the crumb is crushed and forced through the holes. Accordingly, it finishes upon the smooth inner wall from which it is removed by means of a doctor. It is then in the form of small cylindrical granules.

This crumb is then ground, cocoa butter is added to it, for example in a quantity of from 15 to 25 parts for 80 parts of crumb, followed by milling, kneading and conching. More cocoa butter is then added to the product obtained by conching, for example in a quantity of from 2 to 6 parts per 100 parts of product. If desired, aromas, colorants, and the like may then be added, followed by the operation known as tempering and, finally, by moulding.

The method according to the invention is illustrated by the following Examples, in which the percentages and proportions quoted are by weight.

EXAMPLE 1

A mixture is prepared from 35 parts of sweetened concentrated milk with a dry matter content of 62.5%, of which 40% is sugar, 6 parts of milk powder with a fat content of 25%, 40 parts of sugar, 12 parts of cocoa liquor and 0.5 part of lecithin. This mixture is then dried under a reduced pressure of 12 mm Hg by heating to approximately 80° C until it has a residual moisture content of 2.5%. The crumb thus obtained, which contains approximately 21% of fats and around 60% of its sugar in amorphous form (as measured by differential thermoanalysis) is then ground to obtain a powder with an average grain size of 750 $\mu$m. A HUTT machine, model G25-40, is fed with this powder at a rate of 40 kg of powder per hour. This machine essentially comprises two contra-rotating cylinders with an internal diameter of 162 mm each of which comprises 40 grooves and whose walls are drilled, at the bottom of the spaces defined by the grooves, with holes 4 mm in diameter spaced at regular intervals of 3.5 mm. These grooved cylinders rotate at 16.4 revolutions per minute, the crumb in powder form being compressed for an average period of 0.45 second. The pressure undergone by the crumb is approximately 800 kg/cm$^2$ and the temperature of the order of 90° C. The compressed crumb finishes up on the inner wall of the cylinders from which it is removed by doctors. It contains hardly any amorphous sugar. Irregular and fairly coarse cylindrical fragments (approximately 4 mm in diameter and from 0.5 to 5 cm long) are obtained in this way, being reduced into a powder with an average grain size of 800 $\mu$m. 20% of cocoa butter is then added to the powder thus obtained. The mixture is then treated in a cylinder mill and subsequently discharged into a longitudinal conch in which it is conched for 72 hours at 60° C. Another 20% of cocoa butter and 0.5% of vanillin are then added to the conched mass, followed by careful mixing and tempering at 28° C in an automatic tempering machine. The mass thus tempered is finally moulded into tablets. After cooling, the tablets of milk chocolate thus produced are wrapped and then stored for 1 week before tasting.

This milk chocolate, which contains approximately 31% of fats, has a quality of taste and unctuousness comparable with that of a milk chocolate produced by a conventional crumb process (crumb stored for 2 months) and having a fat content of 33%.

EXAMPLE 2

The operations of Example 1 are repeated using a "lean" crumb containing only 8.9% of fats (56.4 parts of sugar, 28 parts of skimmed milk powder and 15.6 parts of cocoa liquor). During compression the temperature of this lean crumb rises to approximately 95° C. The recipe of the milk chocolate is reestablished by adding, before conching, 28% of cocoa butter and not 20% as in Example 1.

The milk chocolate thus produced is comparable with that of Example 1.

We claim:

1. A method of making a milk crumb which comprises:
   a. preparing a mixture selected from the group consisting of (1) milk and sugar and (2) milk, sugar and cocoa;
   b. drying the mixture under reduced pressure to provide a milk crumb; and
   c. compressing the milk crumb under a pressure of at least 100 kg/cm$^2$ at a temperature in the range from 70° to 95° C to effect crystallisation of amorphous form sugar present in the crumb.

2. A method as claimed in claim 1, wherein the milk is a concentrated milk.

3. A method as claimed in claim 2, wherein the milk is a sweetened concentrated milk.

4. A method as claimed in claim 1, wherein the milk is a milk reconstituted from milk powder.

5. A method as claimed in claim 1, wherein the crumb has a moisture content of from 2 to 3%.

6. A method as claimed in claim 1, wherein the crumb is compressed under a pressure of from 600 to 900 kg/cm$^2$.

* * * * *

UNITED STATES PATENT OFFICE
CERTIFICATE OF CORRECTION

PATENT NO. : 4,084,011

DATED : April 11, 1978

INVENTOR(S) : CHEVALLY, ROSTAGNO and BESSON

It is certified that error appears in the above-identified patent and that said Letters Patent are hereby corrected as shown below:

Under foreign application priority, "Sweden" should read --Switzerland--.

Signed and Sealed this

Seventh Day of November 1978

[SEAL]

Attest:

RUTH C. MASON
Attesting Officer

DONALD W. BANNER
Commissioner of Patents and Trademarks